(12) United States Patent  
Paakkunainen et al.

(10) Patent No.: US 12,451,684 B2
(45) Date of Patent: Oct. 21, 2025

(54) ELECTRIC POWER DISTRIBUTION SYSTEM WITH AT LEAST TWO BUS-TIE LINKS

(71) Applicant: Danfoss Editron Oy, Lappeenranta (FI)

(72) Inventors: Jussi Paakkunainen, Lappeenranta (FI); Andrey Lana, Lappeenranta (FI)

(73) Assignee: DANFOSS EDITRON OY, Lappeenranta (FI)

( * ) Notice: Subject to any disclaimer, the term of this patent is extended or adjusted under 35 U.S.C. 154(b) by 0 days.

(21) Appl. No.: 18/247,301

(22) PCT Filed: Sep. 16, 2021

(86) PCT No.: PCT/EP2021/075403
§ 371 (c)(1),
(2) Date: Mar. 30, 2023

(87) PCT Pub. No.: WO2022/078697
PCT Pub. Date: Apr. 21, 2022

(65) Prior Publication Data
US 2023/0378747 A1 Nov. 23, 2023

(30) Foreign Application Priority Data
Oct. 15, 2020 (EP) .................................... 20201968

(51) Int. Cl.
*H02H 7/26* (2006.01)
*H02J 1/08* (2006.01)

(52) U.S. Cl.
CPC ............. *H02H 7/268* (2013.01); *H02J 1/086* (2020.01); *H02J 2310/42* (2020.01)

(58) Field of Classification Search
CPC ....... H02H 7/268; H02J 1/086; H02J 2310/42
See application file for complete search history.

(56) References Cited

U.S. PATENT DOCUMENTS

2004/0102109 A1  5/2004  Cratty et al.
2010/0271759 A1 10/2010  Blystad et al.
(Continued)

FOREIGN PATENT DOCUMENTS

EP   3 229 334 A1  10/2017
JP   2011195049 A  10/2011
(Continued)

OTHER PUBLICATIONS

International Search Report mailed on Dec. 22, 2021, in connection with corresponding International Application No. PCT/EP2021/075403; 4 pages.

(Continued)

*Primary Examiner* — Harry R Behm
(74) *Attorney, Agent, or Firm* — McCormick, Paulding & Huber PLLC

(57) ABSTRACT

An electric power system includes direct voltage buses (101, 102) and at least two bus-tie links (103-105) each being connected between the direct voltage buses. Each bus-tie link has at least one capacitor (106-111) between positive and negative poles of the bus-tie link. At least one pole of each bus-tie link is connected via overcurrent protection devices (112-117), such as fuses, to respective poles (118, 119) of the direct voltage buses. The capacitors of the bus-tie links form a distributed capacitor storage that is capable of providing fault currents to the electric power system to operate overcurrent protection devices so that zonal selectivity is achieved. The electric power system can be for example an electric power system of a ship or another marine vessel.

19 Claims, 2 Drawing Sheets

(56) References Cited

U.S. PATENT DOCUMENTS

| | | | |
|---|---|---|---|
| 2014/0077611 A1* | 3/2014 | Young | H05K 7/14329 |
| | | | 174/68.2 |
| 2016/0009354 A1* | 1/2016 | Lai | B60L 3/0092 |
| | | | 307/9.1 |
| 2017/0229964 A1* | 8/2017 | Jarvelainen | H02H 1/06 |
| 2018/0309297 A1 | 10/2018 | Rauma et al. | |
| 2019/0363707 A1* | 11/2019 | Haugan | H02H 3/087 |
| 2020/0119548 A1* | 4/2020 | Haugan | H02J 1/10 |
| 2023/0268733 A1* | 8/2023 | Reimann | H02J 1/10 |
| | | | 307/18 |

FOREIGN PATENT DOCUMENTS

| | | | |
|---|---|---|---|
| JP | 2013247787 A | 12/2013 |
| JP | 2015515243 A | 5/2015 |
| JP | 2018183038 A | 11/2018 |

OTHER PUBLICATIONS

Extended European Search Report for European Patent Application No. 20201968.3, dated Apr. 8, 2021.

* cited by examiner

ELECTRIC POWER DISTRIBUTION SYSTEM WITH AT LEAST TWO BUS-TIE LINKS

CROSS-REFERENCE TO RELATED APPLICATIONS

This application is a National Stage application of International Patent Application No. PCT/EP2021/075403, filed on Sep. 16, 2021, which claims priority to European Patent Application No. 20201968.3, filed on Oct. 15, 2020, each of which is hereby incorporated by reference in its entirety.

TECHNICAL FIELD

The disclosure relates to an electric power system that can be, for example but not necessarily, an electric power system of a ship or another marine vessel.

BACKGROUND

In many cases, an electric power system comprises two or more direct voltage busses configured to supply electric energy to loads and required to maintain operability independently of each other. The electric power system can be for example an electric power system of a ship or another marine vessel in which case the loads of the electric power system may comprise for example one or more propulsion motors, an alternating voltage network of the marine vessel, and other loads such as e.g. one or more bow thruster motors. The motors are advantageously alternating current "AC" motors and corresponding load-converters are inverters for converting direct voltage of a direct voltage bus into alternating voltages suitable for the AC-motors.

Cost effective designs of electric power systems of the kind mentioned above often end up with high dependency on power flow via interconnected direct voltage busses for normal operation while failure operation is still possible with disconnected direct voltage busses. In a typical design, the direct voltage busses are interconnected with a bus-tie link during normal operation, wherein the bus-tie link is provided with overcurrent protection devices, such as fuses or overcurrent relays, for disconnecting the direct voltage busses from each other in a failure situation. In conjunction with electric power systems of the kind mentioned above, it can be however challenging to maintain zonal selectivity with overcurrent protection because e.g. in a case of a fault on the bus-tie link, fault current may flow to the fault from both of the direct voltage busses and thus each of overcurrent protection devices which connect the bus-tie link to the direct voltage busses carries only a part, e.g. about a half, of the fault current. Thus, in direct voltage electric systems where availability of short-circuit current is limited and/or provided by direct voltage capacitors of the system, a high power rated bus-tie link requires high amount of capacitance on the direct voltage busses in order to provide energy required to activate overcurrent protection devices, e.g. to blow fuses, located on bus-tie link.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electric power system that can be, for example but not necessarily, an electric power system of a ship or another marine vessel.

An electric power system according to the invention comprises first and second direct voltage buses and at least two bus-tie links each being connected between the first and second direct voltage buses, wherein:

each of the bus-tie links comprises at least one capacitor between first and second poles of the bus-tie link, and
at least the first pole of each of the bus-tie links is connected via overcurrent protection devices, e.g. fuses or overcurrent relays, to first poles of the first and second direct voltage buses, each of the overcurrent protection devices being configured to break current in response to an overcurrent situation in the overcurrent protection device.

The capacitors of the above-mentioned bus-tie links form a distributed capacitor storage that is capable of providing fault currents to the electric power system to operate overcurrent protection devices so that zonal selectivity is achieved. The above-mentioned first poles of the bus-tie links and the first poles of the first and second direct voltage buses can be for example positive poles of the bus-tie links and positive poles of the first and second direct voltage buses. It however is also possible that the first poles are negative poles.

In accordance with the invention, there is provided also a new marine vessel that comprises an electric power system according to the invention. The loads of the electric power system of the marine vessel may comprise for example one or more propulsion motors, an alternating voltage network of the marine vessel, and/or other loads such as e.g. one or more bow thruster motors. The motors are advantageously alternating current "AC" motors and corresponding load-converters are inverters for converting direct voltage into alternating voltages suitable for the AC-motors.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments and their advantages are explained in greater detail below in the sense of examples and with reference to the accompanying drawings, in which.

DETAILED DESCRIPTION

The specific examples provided in the description given below should not be construed as limiting the scope and/or the applicability of the appended claims. Lists and groups of examples provided in the description given below are not exhaustive unless otherwise explicitly stated.

Figure 1:
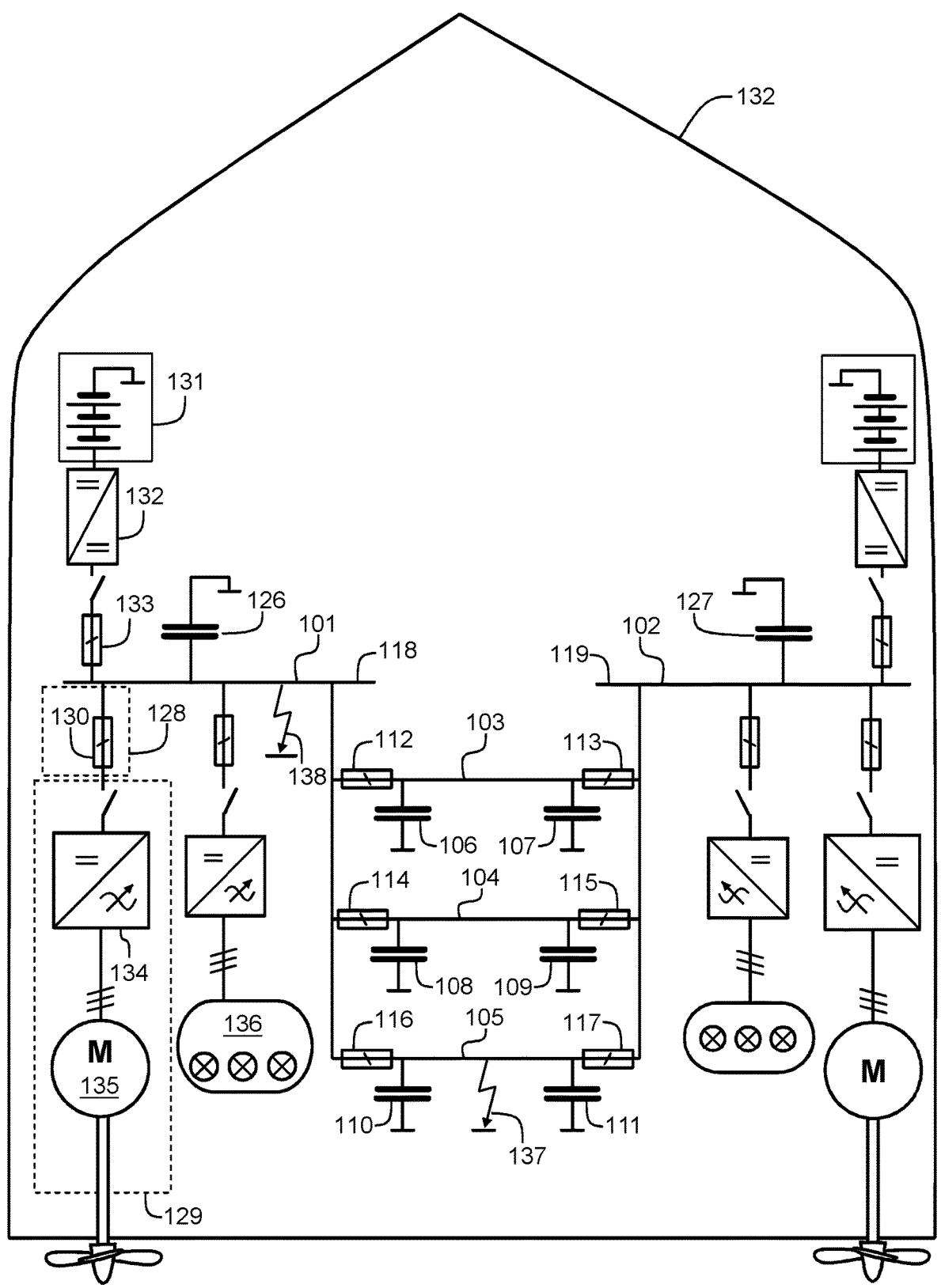
FIG. 1 shows a schematic illustration of an electric power system according to an exemplifying and non-limiting embodiment.

FIG. 1 shows a schematic illustration of an electric power system according to an exemplifying and non-limiting embodiment. In this exemplifying case, the electric power system is an electric power system of a marine vessel 132 that can be e.g. a ship. The electric power system comprises first and second direct voltage buses 101 and 102. In the exemplifying electric power system illustrated in FIG. 1, a power supply arrangement connected to the first direct voltage bus 101 comprises a battery device 131 that is configured to supply electric energy to the first direct voltage bus 101 via a direct voltage-direct voltage "DC-DC" converter 132 and via an overcurrent protection device 133. It is however also possible that an electric power system according to an exemplifying and non-limiting embodiment comprises for example a generator and/or a fuel-cell in addition to or instead of the battery device. In the exemplifying case illustrated in FIG. 1, the overcurrent protection device 133 is a fuse but it is also possible that the overcurrent protection device 133 is an overcurrent relay.

The first direct voltage bus 101 comprises power outlets each of which is configured to supply electric power to a load of the electric power system and is provided with an overcurrent protection device. In FIG. 1, one of the power outlets is denoted with a reference 128 and the overcurrent protection device, e.g. a fuse or an overcurrent relay, of the power outlet 128 is denoted with a reference 130. The load supplied by the power outlet 128 is denoted with a reference 129. In this exemplifying case, the load 129 comprises an alternating current "AC" propulsion motor 135 and an inverter 134 for converting the direct voltage of the first direct voltage bus 101 into alternating voltages suitable for the propulsion motor 135. Furthermore, the first direct voltage bus 101 comprises another power outlet for supplying electric energy to a load that comprises at least a part of an alternating current "AC" network 136 of the marine vessel 132. In the exemplifying electric power system illustrated in FIG. 1, a power supply arrangement and loads connected to the second direct voltage bus 102 are like the power supply arrangement and the loads connected to the first direct voltage bus 101. It is however also possible that the first and second direct voltage buses are connected to different power supply arrangements and/or to different loads.

The electric power system comprises bus-tie links each being connected between the first and second direct voltage buses 101 and 102. In the exemplifying case illustrated in FIG. 1, the electric power system comprises three bus-tie links 103, 104, and 105. It is however also possible that an electric power system according to an exemplifying and non-limiting embodiment comprises only two bus-tie links or more than three bus-tie links between two direct voltage buses. Each of the bus-tie links comprises capacitors between first and second poles of the bus-tie link. The bus-tie link 103 comprises capacitors 106 and 107, the bus-tie link 104 comprises capacitors 108 and 109, and the bus-tie link 105 comprises capacitors 110 and 111. On each of the bus-tie links, the two capacitors are advantageously in a vicinity of the ends of the bus-tie link under consideration so that most of the physical length of the bus-tie link is between the two capacitors. Each capacitor may comprise for example one or more electric double layer capacitor "EDLC" elements.

The first pole of each of the bus-tie links 103-105 is connected via overcurrent protection devices, e.g. fuses or overcurrent relays, to first poles 118 and 119 of the first and second direct voltage buses 101 and 102. The first poles can be e.g. positive voltage poles. Each of the overcurrent protection devices is configured to break current in response to an overcurrent situation in the overcurrent protection device under consideration. The bus-tie link 103 is connected via overcurrent protection devices 112 and 113 to the first poles 118 and 119 of the first and second direct voltage buses 101 and 102. Correspondingly, the bus-tie link 104 is connected via overcurrent protection devices 114 and 115 to the first poles of the first and second direct voltage buses and the bus-tie link 105 is connected via overcurrent protection devices 116 and 117 to the first poles of the first and second direct voltage buses.

For the sake of illustration, we consider an exemplifying fault situation in which there is a fault, e.g. a short circuit or a line-to-earth short circuit, on one of the bus-tie links. Without limiting the generality, we can consider a fault situation in which there is a fault 137 on the bus-tie link 105. In this exemplifying case, current is supplied to the fault 137 by the capacitors 110 and 111. Furthermore, current is supplied to the fault 137 by a capacitor 126 of the first direct voltage bus 101 via the overcurrent protection device 116 and by a capacitor 127 of the second direct voltage bus 102 via the overcurrent protection device 117. Yet furthermore, current is supplied to the fault 137 by capacitors 106 and 107 of the bus-tie link 103 via the overcurrent protection devices 112, 113, 116, and 117. Yet furthermore, current is supplied to the fault 137 by capacitors 108 and 109 of the bus-tie link 104 via the overcurrent protection devices 114, 115, 116, and 117. Thus, the total currents of the overcurrent protection devices 116 and 117 comprise currents from many sources and therefore the overcurrent protection devices 116 and 117 break currents and thereby separate the bus-tie link 105 and the fault 137 from other parts of the electric power system prior to the overcurrent protection devices 112-115 have conducted so much currents for a so long time that overcurrent protection devices 112-115 would react.

Next, we consider an exemplifying fault situation in which there is a fault on one of the direct voltage buses. Without limiting the generality, we can consider a situation in which there is a fault 138 on the first direct voltage bus 101. In this exemplifying case, current is supplied to the fault 138 by the capacitor 126. Furthermore, current is supplied to the fault 138 by capacitors 106-111 via the overcurrent protection devices 112, 114, and 116. As a corollary, the overcurrent protection devices 112, 114, and 116 break currents and thereby the first direct voltage bus 101 is separated from the second direct voltage bus 102.

As illustrated by the above-presented exemplifying fault situations, the capacitors 106-111 of the bus-tie links 103-105 form a distributed capacitor storage that is capable of providing fault currents to the electric power system to operate overcurrent protection devices so that zonal selectivity is achieved.

Figure 2:
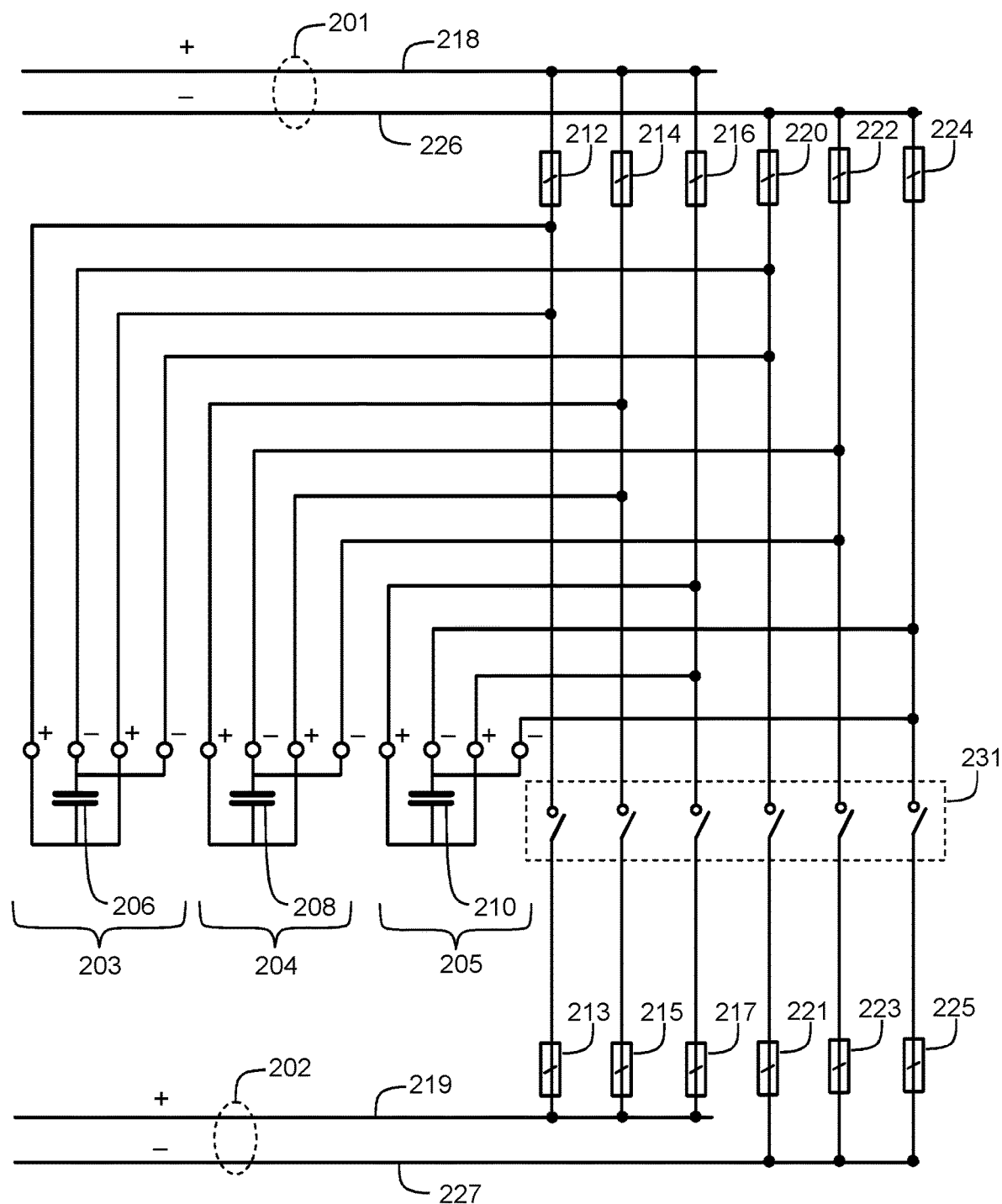
FIG. 2 shows a schematic illustration of an electric power system according to an exemplifying and non-limiting embodiment.

FIG. 2 shows a schematic illustration of an electric power system according to an exemplifying and non-limiting embodiment. The electric power system comprises first and second direct voltage buses 201 and 202. The electric power system comprises three bus-tie links 203, 204, and 205 each being connected between the first and second direct voltage buses 201 and 202. Each of the bus-tie links comprises a capacitor between first and second poles of the bus-tie link. The bus-tie link 203 comprises a capacitor 206, the bus-tie link 204 comprises a capacitor 208, and the bus-tie link 205 comprises a capacitor 210. The first pole of each of the bus-tie links 203-205 is connected via overcurrent protection devices 212, 213, 214, 215, 216, and 217, e.g. fuses or overcurrent relays, to first poles 218 and 219 of the first and second direct voltage buses 201 and 202. Correspondingly, the second pole of each of the bus-tie links 203-205 is connected via overcurrent protection devices 220, 221, 222, 223, 224, and 225 to second poles 226 and 227 of the first and second direct voltage buses 201 and 202. In the exemplifying electric power system illustrated in FIG. 2, the above-mentioned first poles are positive poles and the above-mentioned second poles are negative poles. In the exemplifying electric power system illustrated in FIG. 2, the bus-tie links comprise switch disconnectors 231 for disconnecting an electric connection implemented with the bus-tie links between the first and second direct voltage buses 201 and 202.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An electric power system comprising first and second direct voltage buses wherein:
   the electric power system further comprises at least two bus-tie links connected in parallel between the first and second direct voltage buses,
   each of the bus-tie links having a first pole connected to first poles of the first and second direct voltage buses and a second pole connected to second poles of the first and second direct voltage buses,
   each of the bus-tie links comprises at least one capacitor between the first and second poles of the bus-tie link, and
   at least the first pole of each of the bus-tie links is connected via overcurrent protection devices to the first poles of the first and second direct voltage buses, each of the overcurrent protection devices being configured to break current in response to an overcurrent situation of the overcurrent protection device.

2. The electric power system according to claim 1, wherein the second pole of each of the bus-tie links is connected via other overcurrent protection devices to second poles of the first and second direct voltage buses.

3. The electric power system according to claim 2, wherein each of the bus-tie links comprises two capacitors each being between the first and second poles of the bus-tie link.

4. The electric power system according to claim 2, wherein the first direct voltage bus comprises a first bus capacitor between the first pole of the first direct voltage bus and a second pole of the first direct voltage bus.

5. The electric power system according to claim 2, wherein the second direct voltage bus comprises a second bus capacitor between the first pole of the second direct voltage bus and a second pole of the second direct voltage bus.

6. The electric power system according to claim 1, wherein each of the bus-tie links comprises two capacitors each being between the first and second poles of the bus-tie link.

7. The electric power system according to claim 6, wherein the two capacitors are in a vicinity of ends of the bus-tie link under consideration so that most of the physical length of the bus-tie link is between the two capacitors.

8. The electric power system according to claim 7, wherein the first direct voltage bus comprises a first bus capacitor between the first pole of the first direct voltage bus and a second pole of the first direct voltage bus.

9. The electric power system according to claim 7, wherein the second direct voltage bus comprises a second bus capacitor between the first pole of the second direct voltage bus and a second pole of the second direct voltage bus.

10. The electric power system according to claim 6, wherein the first direct voltage bus comprises a first bus capacitor between the first pole of the first direct voltage bus and a second pole of the first direct voltage bus.

11. The electric power system according to claim 6, wherein the second direct voltage bus comprises a second bus capacitor between the first pole of the second direct voltage bus and a second pole of the second direct voltage bus.

12. The electric power system according to claim 1, wherein the first direct voltage bus comprises a first bus capacitor between the first pole of the first direct voltage bus and a second pole of the first direct voltage bus.

13. The electric power system according to claim 12, wherein the second direct voltage bus comprises a second bus capacitor between the first pole of the second direct voltage bus and a second pole of the second direct voltage bus.

14. The electric power system according to claim 1, wherein the second direct voltage bus comprises a second bus capacitor between the first pole of the second direct voltage bus and a second pole of the second direct voltage bus.

15. The electric power system according to claim 1, wherein each of the first and second direct voltage buses comprises at least one power outlet provided with a power outlet overcurrent protection device and suitable for supplying electric power to a load of the electric power system.

16. The electric power system according to claim 1, wherein each capacitor of each of the bus-tie links comprises one or more electric double layer capacitor elements.

17. The electric power system according to claim 1, wherein the overcurrent protection devices comprise fuses.

18. The electric power system according to claim 1, wherein each of the bus-tie links comprises a switch disconnector for disconnecting an electric connection implemented with the bus-tie link between the first and second direct voltage buses.

19. A marine vessel comprising the electric power system according to claim 1.

* * * * *